United States Patent
Peon et al.

(10) Patent No.: US 9,432,274 B1
(45) Date of Patent: Aug. 30, 2016

(54) INTERMEDIARY FACILITATED PACKET LOSS RECOVERY

(71) Applicant: Google Inc., Mountain View, CA (US)

(72) Inventors: Roberto Javier Peon, Palo Alto, CA (US); James Anthony Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 14/070,389

(22) Filed: Nov. 1, 2013

(51) Int. Cl.
*H04W 24/04* (2009.01)
*H04L 12/26* (2006.01)

(52) U.S. Cl.
CPC .................... *H04L 43/0829* (2013.01)

(58) Field of Classification Search
None
See application file for complete search history.

(56) References Cited

U.S. PATENT DOCUMENTS

| | | | |
|---|---|---|---|
| 5,650,993 A | 7/1997 | Lakshman et al. | |
| 6,282,203 B1 | 8/2001 | Yeom et al. | |
| 7,177,272 B2 | 2/2007 | Swami | |
| 8,488,485 B2 | 7/2013 | Carlsson et al. | |
| 2004/0264366 A1* | 12/2004 | Swami | H04L 1/1635 370/229 |
| 2008/0155111 A1* | 6/2008 | Takeuchi | H04L 67/2852 709/230 |
| 2012/0163385 A1* | 6/2012 | Lee | H04L 47/17 370/392 |

* cited by examiner

*Primary Examiner* — Awet Haile (74) *Attorney, Agent, or Firm* — McDermott Will & Emery LLP (57) ABSTRACT

A system and method for facilitating packet loss recovery using an intermediary are provided. The system includes a first node configured to transmit a plurality of data packets, a second node configured to receive the plurality of data packets and a third node configured to act as an intermediary between the first node and the second node and is configured to receive one or more packets of the plurality of data packets transmitted from the first node to the second node before the one or more packets are transmitted to the second node, and determine if a packet loss event has occurred, wherein a packet loss event occurs if a first packet of the plurality of packets is lost during transmission from the first node to the second node and take an action with respect to the first packet if it determined that a packet loss event has occurred.

20 Claims, 4 Drawing Sheets

INTERMEDIARY FACILITATED PACKET LOSS RECOVERY

BACKGROUND

Packet loss occurs when one or more packets of data traveling across a computer network fail to reach their destination. Packet loss can be caused by a number of factors including signal degradation over the network medium due to multi-path fading, packet drop due to channel congestion, corrupted packets rejected in-transit, faulty networking hardware, faulty network drivers or normal routing routines. Packet loss rates hover around 1-2% of all packets transmitted. Recovery from a loss often involves detection of a loss at the receiver, communicating that loss to the sender, and re-transmitting the packet data. In such cases, the recovery of the lost data may be significantly delayed, in proportion to the end-to-end round trip time. This problem is routinely exacerbated in transmission protocols such as TCP where in-order-delivery requires that all packets after the lost packet be similarly delayed (pending arrival of the lost packet). It would be advantageous if the network response to lost packets could be improved, and the delay to re-transmit a lost packet decreased.

SUMMARY

The disclosed subject matter relates to a system for facilitating packet loss recovery using an intermediary, the system comprising a first node configured to transmit a dataset comprising a plurality of data packets. The system further comprising a second node configured to receive the plurality of data packets and a third node configured to act as an intermediary between the first node and the second node, wherein the third node is configured to receive one or more packets of the plurality of data packets transmitted from the first node to the second node before the one or more packets are transmitted to the second node. The third node further configured to determine if a packet loss event has occurred, wherein a packet loss event occurs if a first packet of the plurality of packets is lost during transmission from the first node to the second node and take an action with respect to the first packet if it determined that a packet loss event has occurred.

The disclosed subject matter also relates to a computer-implemented method for facilitating packet loss recovery using an intermediary, the method comprising receiving, using one or more computing devices, one or more data packets of a plurality of packets transmitted from a first node at an intermediary node, wherein the data packets are transmitted from the first node to a second node and wherein the one or more packets are received at the intermediary node before the one or more packets are transmitted to the second node. The method further comprising determining, at the intermediary node, using the one or more computing devices, if a packet loss event has occurred, wherein a packet loss event occurs if a first packet of the plurality of packets is lost during transmission from the first node to the second node and taking an action, at the intermediary node, using the one or more computing devices, with respect to the first packet if it determined that a packet loss event has occurred.

The disclosed subject matter also relates to a non-transitory machine-readable medium comprising instructions stored therein, which when executed by a machine, cause the machine to perform operations comprising determining, at an intermediary node, if a packet loss event has occurred, wherein the intermediary is configured to receive a plurality of packets transmitted from a first node to a second node from the first node before the packets are transmitted to the second node, and wherein a packet loss event occurs if a first packet of the plurality of packets is lost during transmission from the first node to the second node and taking an action, at the intermediary node, using the one or more computing devices, with respect to the first packet if a packet loss event has occurred.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The present disclosure provides methods and systems for facilitating packet loss recovery using an intermediary, while reducing latency caused by packet loss. In some instances, one or more intermediaries may be involved in the communication of data (packets) from a sender to a receiver, and/or the communication of acknowledgments (e.g., ACKs and/or NACKs) from the receiver to the sender. Example intermediaries may for example include a home router, a firewall, a terrestrial satellite, a designated proxy, a cell tower or other third parties that may split the route from a sender to a receiver.

In one example, any third party node that is privy to packets traversing a specific route between two end points may serve as an intermediary. In some embodiments, the intermediary node may record information about what packets pass between two end points (e.g., sender, receiver and/or another intermediary), and may optionally buffer copies of those packets for some period of time. For example, all packets that travel from a LAN to a point on the Internet, such as a server, may pass through a home firewall router which can then act as intermediary between the LAN and server. As another example, all packets on a corporate network that are destined to reach an external address may pass through a proxy server, and thus, the proxy server may act as an intermediary between the corporate network and the external address. In other examples, all packets conveyed through an Earth-orbiting satellite, from an island (with no other Internet connection), would pass through the satellite, allowing the satellite to act as an intermediary. Similarly, information passed between a cellular phone to one or more other cellular phones or a central location may pass through a cell tower which may act as the intermediary.

The intermediary node may split the route between the two end points, and may thus divide where a packet is lost during transmission from one end point to another end point (e.g., a transmission between two end points over a TCP or QUIC connection). The intermediary, may, for example, keep track of what packets pass from the sender end point to a receiver end point and/or acknowledgment messages sent from the receiver end point to the sender end point. In some implementations the intermediary may record information about packets that pass through the intermediary. For example, with protocols where data is sent in segments (e.g., packets in a TCP stream), the intermediary may record what data segments have been sent in one direction, and what acknowledgments (e.g., ACKs and/or NACKs) have been forwarded in the reverse direction. In some examples, where data (e.g., data packets or segments) is sent with an indication of the order or position of the data packet within a larger dataset, such as sequence numbers (e.g., a QUIC connection) or a bit range (e.g., a TCP connection), the intermediary may record the indicators for each data item (e.g., packet) forwarded in each direction, and/or information regarding the data item including, for example, size and time of arrival of each data item. In one or more examples, the intermediary may further preserve copies of the data (e.g., packets), for example, by buffering copies of the data.

Using the information regarding the data transmission, the intermediary, in some implementations, can detect where within a route of transmission the data is lost. For example, an intermediary node may detect that a packet was lost by observing a gap in sequencing of packets and/or transmissions that go through the intermediary. In protocols, such as TCP, where packets include a byte range indication, for example, an intermediary may detect a gap in the byte range conveyed in a sequence of packets. As a second example, when observing a connection including packet sequence indicators, such as a QUIC connection, an intermediary may detect a missing sequence number when observing packets.

The intermediary may then facilitate a process for recovery of lost packets, while avoiding re-transmission of a packet over a portion of the transmission route on which the packet was not lost, and hence reduce the bandwidth cost of a re-transmission. The splitting of the transmission route by the intermediary may facilitate better understanding of congestion on each of the segments, and provide for better utilization of available bandwidth. The splitting, in some implementations, may reduce the distance a re-transmitted packet must travel, and hence reduce the latency cost of recovery.

In some implementations, a data packet loss event is detected as packets being transmitted from a sender arrive at the intermediary before transmission to the receiver. The packets may include indicia of belonging in a larger dataset and/or indicia of their ordering within the dataset. In some examples, the intermediary collects information regarding packets that arrive at the intermediary. The collected information may include and/or be based on the indication of the packet being part of a bigger dataset and/or the indicia of the ordering of the packet within the dataset. Based on the information, the intermediary, in some instances, detects missing data packets. For example, a missing data packet may be detected in response to observing a gap in sequencing of packets (e.g., based on a byte range or sequence number of the packet, and one or more other packets within the dataset of data being transmitted). Upon detecting the packet loss at the intermediary, the intermediary may generate a notification to be sent to the sender.

In some implementations, during transmission, packets intended for the receiver first pass through the intermediary, and therefore, the loss is likely to be detected at the intermediary sooner than at the receiver. In some examples, the intermediary is able to detect the packet loss at a time proximate to forwarding the packets to the receiver. Furthermore, in some implementations, the transmission distance from the intermediary to the sender is shorter as compared to the transmission route from the receiver to the sender. The intermediary is able to quickly detect a missing packet and transmit the missing packet notification to the sender, such that the sender is able to resend the lost packet. This is likely to reduce latency, as packet loss, previously being detected after packets arrive at the receiver, is detected earlier at the intermediary, and transmission of lost packets is made quicker by having to traverse a smaller distance from sender to an intermediary rather than the receiver.

In some implementations, packet loss may occur during the second leg of the communication route, from the intermediary to the receiver. In some implementations, as packets being forwarded to the receiver arrive at the intermediary before being sent to the receiver, the intermediary may store the data packets routed through the intermediary. The receiver usually sends acknowledgments when receiving packets. In some implementations, the receiver may send a notification of a lost or missing packet (e.g., repetitive ACKs or NACKs) upon detecting a gap in the sequencing of packets to indicate a packet loss. In some examples, the intermediary receives the notifications from the receiver before they are forwarded to the sender. The intermediary may detect the notification of a loss packet sent from the receiver. Upon detecting a notification of a lost packet, the intermediary, in some implementations, determines if the packet being indicated as being lost, and thus, not having reached the receiver, arrived at the intermediary (e.g., the loss occurred on the portion of the route after the packet left the intermediary and before arrival at the receiver).

The intermediary, as described above, may store packets arriving at the intermediary from a sender, and may store those packets before the packets are passed through to the receiver. Upon detecting a loss packet notification from the receiver, if the packet has been stored at the intermediary, the intermediary may retrieve the packet and send the stored packet to the receiver. Thus, the notification does not have to be provided to the sender for a response and/or the packet does not have to be transmitted again from the sender. In one example, the sender does not need to be notified of the issue and/or may only be notified that the issue has been remedied once the packets are sent from the intermediary to the receiver. Accordingly, the issues at the receiver regarding lost packets may be more quickly resolved due to a faster response time (since the intermediary can respond once the notification is at the intermediary) and/or a shorter route for retransmission time of the packet (e.g., from the intermediary to the receiver).

While the communications here are described with respect to a single intermediary, and a single sender/receiver, it should be understood that a route from a sender to receiver may include multiple intermediaries, thus, splitting the route into multiple portions. Any communication from a first node (e.g., intermediary, sender and/or receiver) to a second node (e.g., intermediary, sender and/or receiver), may go through at least a third node, which acts as the intermediary of the first and second nodes. The node which sends data is referred to generally as a sender, whereas the node which receives the packet and provides an acknowledgment or notification of failure to receive the data is referred to generally as the receiver. In some examples, an intermediary may act as a receiver for another intermediary, thus splitting the route into multiple legs. In other examples, the intermediary may act as a sender to another intermediary.

The communications from intermediary to end points (e.g., sender and receiver) may be performed using the same transmission route and/or communication channel that is used to communicate from the sender to the receiver. In another example, a separate connection may be created from the intermediary to send messages to the sender and/or to provide data to the receiver.

In one example, how communication from an intermediary is treated by an end point sender or receiver (e.g., acted upon, treated as a suggestion/hint or ignored until further authentication) depends on the level of trust between the sender and/or receiver and the intermediary. In one example, messages received from the intermediary may not be trusted by the sender/receiver. In some embodiments, the intermediary may build trust with an end point according to messages communicated over time. For example, a trust relationship may be built by checking the response of an intermediary against the response of the expected respondent. In one example, the sender may notice that messages received from the intermediary regarding lost or missing packets correspond to same messages from the receiver and/or are received earlier than the same message by the receiver. Similarly, the receiver may notice that the packets provided by the intermediary contain the same data as those sent by the sender in response to a notification of lost/missing data and/or that the data from the intermediary is received earlier than from the sender. Such correlation may cause a trust relationship between the intermediary and the sender and/or receiver, such that the sender and/or receiver begin to take appropriate actions in response to communications from the intermediary and without needing to authenticate the intermediary or wait for communication from the sender/receiver.

Accordingly, the system and methods described herein facilitate optimizing data transmission between two nodes by facilitating intermediary packet loss recovery.

Figure 1:
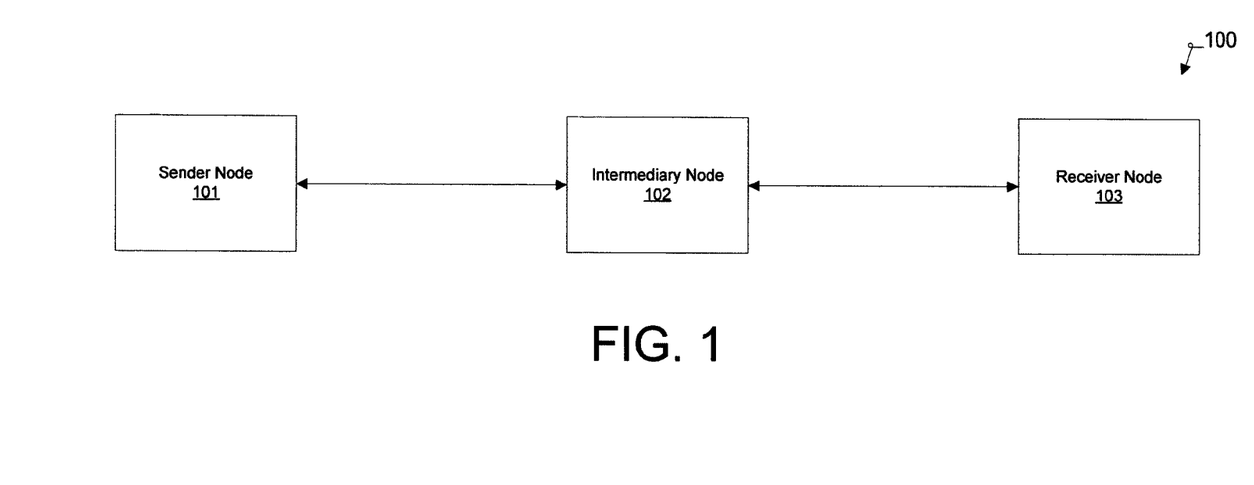
FIGS. 1 and 2 illustrate an example client-server network environment, which provides for facilitating reducing latency caused by packet loss in data transmission through intermediary packet loss recovery.
Figure 2:
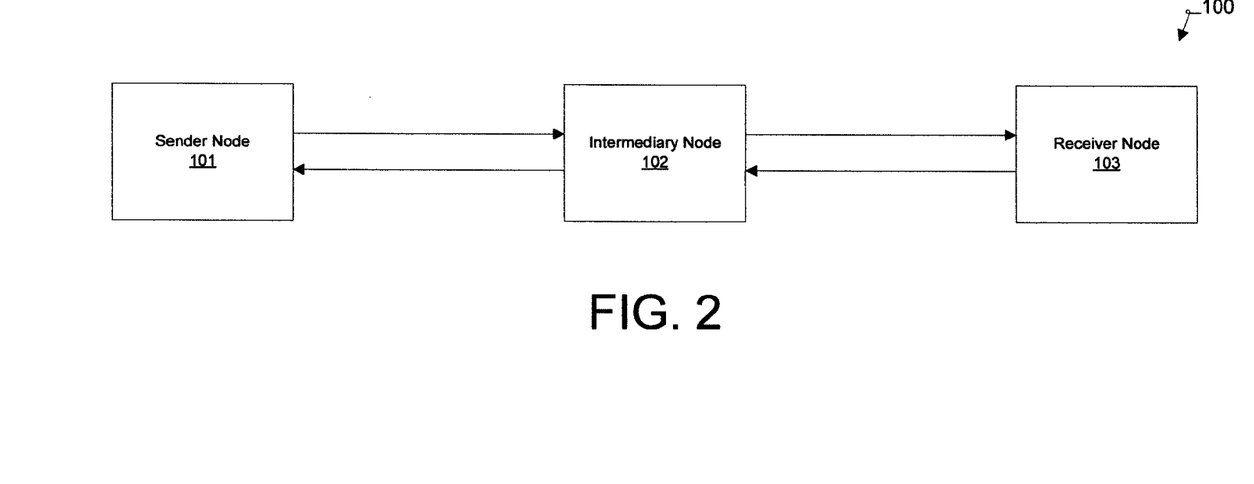

FIGS. 1 and 2 illustrate an example client-server network environment 100, which provides for facilitating reducing latency caused by packet loss in data transmission through intermediary packet loss recovery.

A network environment 100 includes a sender 101, an intermediary 102 and a receiver 103. The sender 101 is communicably coupled to the intermediary 102, which is communicably coupled to the receiver 103. In one example, the coupling between the sender 101 and receiver 103 may be facilitated through the intermediary 102. In one example, the coupling between the sender 101, intermediary 102 and receiver 103 may be through a network connection. The network connection can be a public communication network (e.g., the Internet, cellular data network, dialup modems over a telephone network) or a private communications network (e.g., private LAN, leased lines).

In one example, the coupling between the sender 101, intermediary 102 and/or receiver 103 may be facilitated through a wired or wireless network including, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like. Communications between the sender 101 (e.g., server) and receiver 103 (e.g., client) through the intermediary 102 may be facilitated through the QUIC, TCP/IP, HTTP, XMPP or other communication protocol, using SSL, UDP or other secure cryptographic protocols to facilitate secure connection.

In some implementations, sender 101 and/or receiver 103 can be a server or a computing device such as laptop or desktop computers, smartphones, PDAs, portable media players, tablet computers, or other appropriate computing devices. In some example aspects, sender 101 and/or receiver 103 may be coupled with various remote databases or storage services. It should be understood that the functions performed by sender 101 and/or receiver 103 may be performed within a single server or computing device, or across multiple servers or devices.

In some cases, the intermediary 102 may be a server and/or computing device that splits the route from sender 101 (e.g., a server) to receiver 102 (e.g., a client). The intermediary 102 may for example include a router, proxy, satellite, cell tower or other computing device or server that facilitates communication between sender 101 and receiver 103. In some example implementations, intermediary 102 includes a processing device and a data store. The processing device may for example execute computer instructions stored in data store, for example, to facilitate reducing latency caused by packet loss in data transmission through intermediary packet loss recovery.

Data being sent from sender 101 (e.g., a server, a client device or application) may be sent in packets to receiver 103 (e.g., a server, a client device or application). In one example, the intermediary 102 may split the route of data communication from the sender 101 to receiver 103. Thus, the data packets being sent from the sender 101 to receiver 103 may first go through the intermediary 102, in some implementations. The intermediary, may, in response to receiving data packets sent from the sender 101 identify lost packets and request the lost packets from the sender, leading to reduced round trip time and latency for packets lost in the route from the sender 101 to the intermediary 102. Furthermore, the intermediary 102 may be configured to communicate with the receiver 103 to receive notifications from the receiver when the receiver sends an indication of a lost packet. The intermediary may, upon receiving the indication, determine if the packet was received and/or stored at the intermediary 102, and forward the packet to the receiver 103.

In one example, as shown in FIG. 1, the communications from intermediary 102 to sender 101 and receiver 103 may be performed using the same transmission route and/or communication channel that is used to communicate from the sender 101 to the receiver 103. In another example, shown in FIG. 2, a separate connection may be created from the intermediary 102 to send messages to the sender 101 and/or to provide data to the receiver 103.

Figure 3:
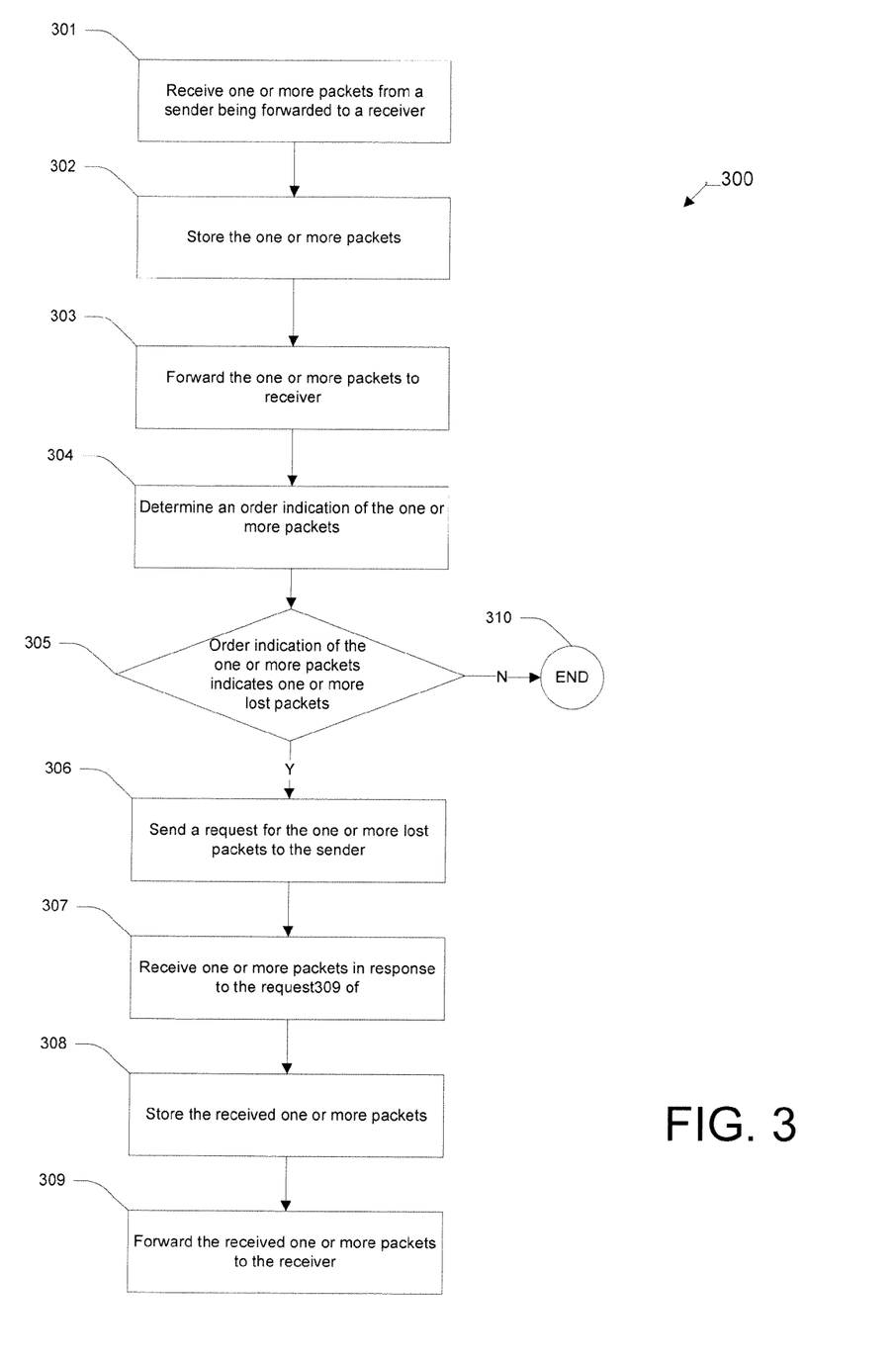
FIG. 3 illustrates a flow diagram of an example process for facilitating packet loss recovery for packets transmitted to a receiver, while reducing latency caused by packet loss in data transmission.

FIG. 3 illustrates a flow diagram of an example process 300 for facilitating packet loss recovery for packets transmitted to a receiver, while reducing latency caused by packet loss in data transmission. In step 301, an intermediary (e.g., intermediary 102) receives one or more packets of a dataset from a sender (e.g., sender 101) being transmitted to a receiver (e.g., receiver 103). In some cases, an intermediary may split a route from a client to a server. This splitting may divide where data is lost during transit to either the client side or the server side. In some embodiments, an intermediary node on a network, such as a home router, firewall, terrestrial satellite or designated proxy, web server, cellphone tower, or other intermediary may be privy to all packets traversing a specific route, such as a flow that is part of a TCP or QUIC connection between two endpoints. For example, all packets that travel from a LAN to a point on the Internet, such as a server, generally pass through a home firewall router. As another example, all packets on a corporate network that are destined to reach an external address may pass through a proxy server. As a third example, all packets conveyed through an Earth-orbiting satellite, from an island (with no other Internet connection), pass through the satellite.

In step 302, the one or more packets may be stored at the intermediary. In step 303, the intermediary begins to forward the one or more packets to the receiver. In step 304, the intermediary determines an order indicator for the one or more packets received in step 301. In some embodiments, an intermediary node privy to packets on a route (e.g., set of packets in a TCP or QUIC stream), may observe information about what packets pass through, and may determine that a set of packets makes up a dataset, and may identify an indicator or identifier of the position of each packet within the dataset. The indicator may for example include a byte range (e.g., in a TCP stream), or sequence number (e.g., in a QUIC stream) identifying the ordering of the packet within the dataset.

In step 305, based on the order indicator for the one or more packets, the intermediary determines if one or more packets of the dataset were lost in the transmission. In some embodiments, an intermediary node may detect that a packet was lost, such as by observing a gap in sequencing of packets (e.g., the received packet and one or more other packets). For example, the intermediary may detect a gap in the byte range conveyed in a sequence of packets (e.g., when observing a TCP connection) and/or a missing sequence number when observing packets (e.g., when observing a QUIC connection).

If, in step 305, the intermediary determines that no packets were lost, the process ends in step 3100. Otherwise, in step 306, the intermediary sends a request for the one or more lost packets to the sender. In some embodiments, when an intermediary detects a lost packet, it may synthesize and transmit a notification (e.g., NACK) to the sender of the packets. In some examples, the notification may be sent over the same transmission connection used by the sender to send packets to the receiver. In another example, a second connection may be used to send the notification. In some embodiments, the intermediary that is monitoring the connection cannot decipher contents of the connection packets beyond its sequence number, or synthesize cryptographically authenticated packets for insertion in the monitored connection, and may instead use a second connection to convey such notifications to a sender. For example, the second connection may be a direct connection between the intermediary and the sender, such as a TCP connection, a QUIC connection, or a UDP messaging connection.

In step 307, the intermediary may, in response to the notification sent to the sender, receive a retransmitted packet corresponding to the lost packet from the sender. In one example, the sender may only respond to the notification from the intermediary once a trust relationship exists between the intermediary and sender. A trust may be established for example by verifying the connection between the intermediary and sender (e.g., in a separate connection) and/or by verifying communications from the intermediary and/or receiver(s) to the sender (e.g., past communications of lost packets sent from the intermediary that were verified). In one example, with a TCP connection, the intermediary may be able to identify the retransmission of the lost packet. In one example, with a QUIC connection, the intermediary may not be able to identify the retransmission of data, such as when the sender rebundled the data from the lost packet in a new packet with a new packet sequence number, and encrypts the packet.

Figure 4:
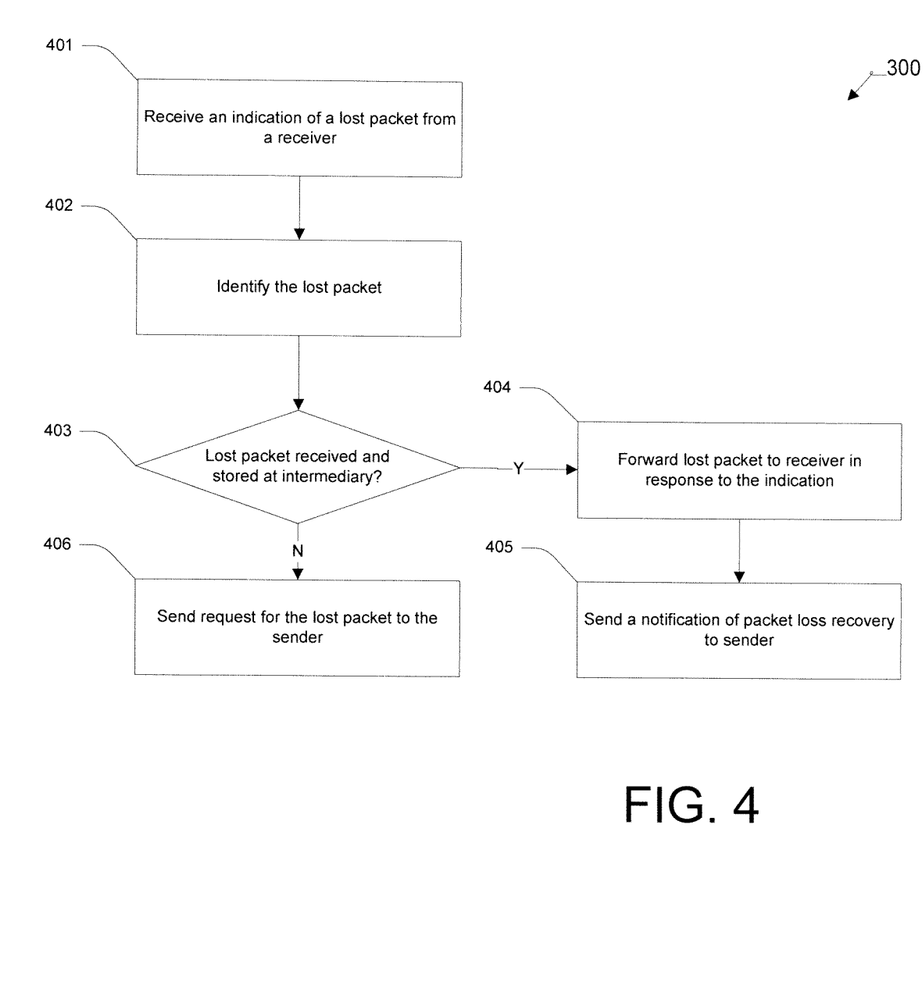
FIG. 4 illustrates a flow diagram of an example process for facilitating responding to packet loss notifications from a receiver, while reducing latency caused by packet loss in data transmission.

In step 308, the one or more packets received in step 307 are stored at the intermediary. The received one or more packets may then be forwarded to the receiver, in step 309. In some examples, step 303 of forwarding the received packets and steps 304-309 of retrieving lost packet(s) may be performed in parallel. In another example, upon detecting a lost packet, the intermediary may delay forwarding some of all other packets of the data set received at the intermediary to the receiver, until the lost packet(s) is received and may then proceed to forward the packets to the receiver. In some examples, upon receiving retransmitted packages in step 307 a determination similar to the determination in steps 304 and 305 may be made and if any packets are determined to be missing from the requested one or more lost packets, another request may be provided to retrieve the lost packets. FIG. 4 illustrates a flow diagram of an example process 400 for facilitating responding to packet loss notifications from a receiver, while reducing latency caused by packet loss in data transmission. In step 401, the intermediary receives an indication of a lost packet from a receiver. The notification may include a NACK sent from the receiver for forwarding to the sender when it is determined that a packet of a dataset did not reach the receiver. The notification may include an explicit NACK sent directly from the receiver to the intermediary, such as described in FIG. 2, using a separate connection from the receiver to the intermediary. For example, with a QUIC connection, an intermediary may not be able to decrypt and interpret a NACK sent by the receiver through the intermediary, as shown in FIG. 1, and the alternate connection shown in FIG. 2 may be needed.

In step 402, the intermediary identifies the lost packet, and in step 403, the intermediary determines if the identified lost packet was received and stored at the intermediary. In some embodiments, when an intermediary receives notification that a packet has been lost, it may re-transmit the lost packet to compensate for the loss. In one example, the identification may be according to a packet bit range or sequence number associated with the lost packet. In one example, if an intermediary is buffering copies of packets sent from a sender to a receiver in a connection, and it observes a NACK being sent for a packet that the intermediary has received from the sender and already forwarded to the receiver, it is likely that the packet was lost on its way from the intermediary to the receiver. In some examples, the NACK may be received as it is being transmitted over the original connection to a sender. In some examples, the intermediary (e.g., due to encryption) is not able to detect the NACK transmitted to the sender, but may receive the notification over a second connection. In some examples, the receiver may send a NACK over a separate connection established between the receiver and the intermediary.

If, in step 403, it is determined that the packet arrived at the intermediary and was stored by the intermediary, in step 404, the intermediary may forward the packet to the receiver in response to the indication. For example, the intermediary, may access a storage (e.g., buffer), obtain the packet and re-transmit the missing packet to the receiver. In one example, having recovered the missing packet, the intermediary may optionally discard the NACK.

In some implementations, after retransmitting the packet, in step 405, the intermediary may send a notification of the packet loss recovery to the sender. In some embodiments, when an intermediary re-transmits a packet, it may contact the sender to indicate that packet loss occurred, and was remedied. For example, when an intermediary re-transmits a lost packet to a recipient after being notified of the loss by the trusting recipient, it may also attempt to contact the sender to report these events. In that example, the intermediary may not be able to insert notification into the observed stream, for instance because the stream is encrypted and authenticated, and may use a second connection to contact the sender.

Otherwise, if in step 403 the intermediary determines that the identified packet was not received and/or not stored at the intermediary, in step 406, the intermediary forwards the notification (e.g., NACK) to the sender. In another example, the intermediary may send a separate request for the missing packet to the sender and receive the packet for forwarding to the receiver in response to the notification.

In one example, the communications between the intermediary and the receiver and/or sender may be validated by establishing a validated connection (e.g., a separate connection that the sender/receiver transmission connection) and/or through a trust relationship built between the receiver and the intermediary.

In some embodiments, there may more than one intermediary along a path, and the techniques described may be applied recursively.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
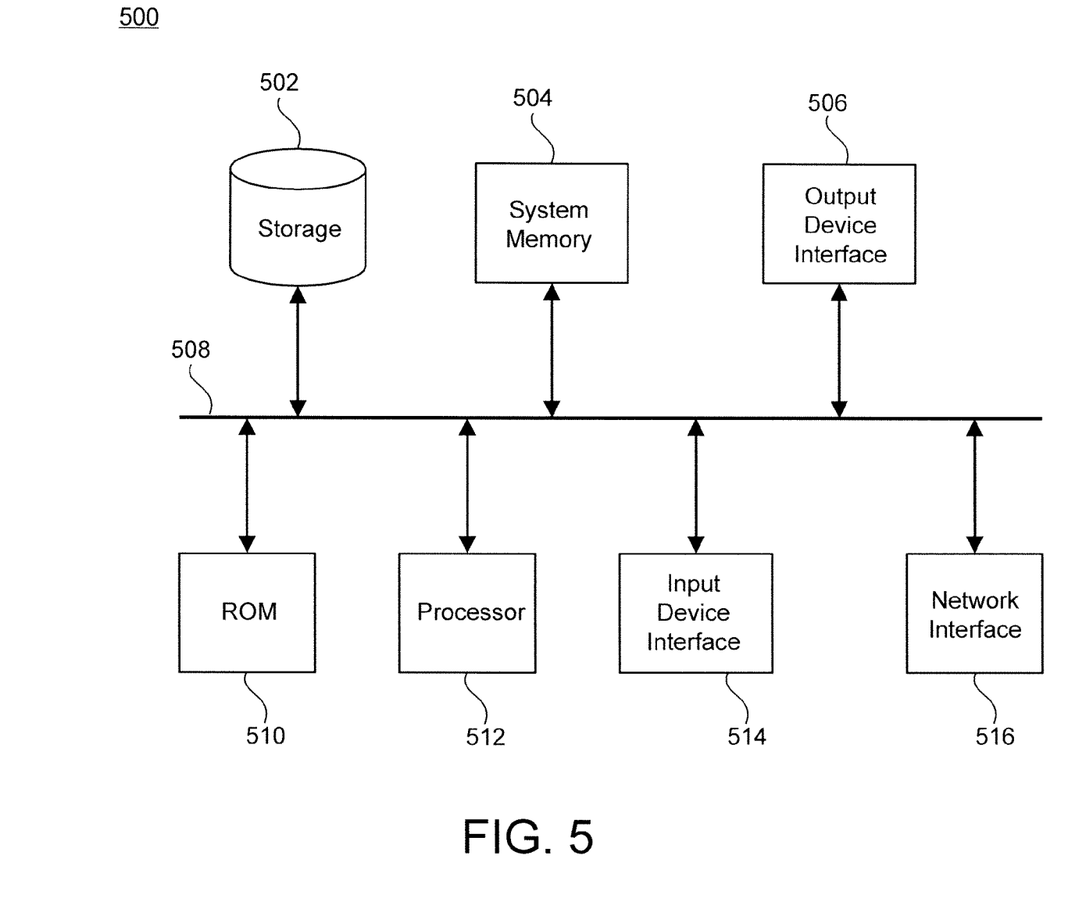
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime.

In some implementations, the processes of the subject disclosure are stored in system memory 504, permanent storage device 502, and/or ROM 510. For example, the various memory units include instructions for facilitating package loss recovery using an intermediary according to various implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A system comprising:
   a first node configured to transmit a dataset comprising a plurality of packets;
   a second node configured to receive the plurality of packets; and
   a third node configured to:
     act as an intermediary between the first node and the second node, wherein the third node is configured to receive one or more packets of the plurality of packets transmitted from the first node to the second node before the one or more packets are transmitted to the second node;
     determine if a packet loss event has occurred, wherein the packet loss event occurs when a first packet of the plurality of packets is lost during transmission from the first node to the second node;
     determine if the first packet was received from the first node at the third node if it is determined that the packet loss event has occurred;
     send the first packet to the second node when the first packet was received from the first node at the third node; and
     transmit a notification to the first node indicating that the packet loss event occurred and was remedied when the packet loss event occurs and the first packet is sent to the second node by the third node.

2. The system of claim 1, wherein determining if the packet loss event occurred comprises:
   determining that the first packet from the first node has not arrived at the third node.

3. The system of claim 2, wherein the determining that the first packet has not arrived at the third node comprises:
   determining an order indication for the one or more packets received at the third node; and
   determining the first packet has not arrived at the third node based at least in part on the order indication for the one or more packets.

4. The system of claim 3, wherein the order indication comprises a byte range for each of the one or more packets.

5. The system of claim 3, wherein the order indication comprises a sequence number associated with each of the one or more packets.

6. The system of claim 1, wherein the third node is further configured to:
   generate another notification indicating that the first packet was lost during transmission from the first node to the second node when it is determined that the first packet was lost during transmission from the first node to the second node; and
   send the another notification to the first node.

7. The system of claim 6, wherein the third node is further configured to:
   receive the first packet at the third node in response to the another notification; and
   send the first packet to the second node.

8. The system of claim 6, wherein the first packet is sent to the third node from the first node in response to the another notification when the first node and the third node have an established trust relationship.

9. The system of claim 6, wherein the another notification is sent through a same transmission connection that the first node uses to send the plurality of packets to the second node.

10. The system of claim 6, wherein the another notification is sent through a second connection established between the third node and the first node, wherein the second connection is different than a first connection that the first node uses to send the plurality of packets to the second node.

11. The system of claim 1, wherein determining if the packet loss event occurred comprises receiving, at the third node, another notification being sent from the second node to the first node indicating that the first packet was not received at the second node.

12. The system of claim 11, wherein the first packet is sent through a same transmission connection that the second node uses to send the another notification.

13. The system of claim 11, wherein the first packet is sent through a second connection established between the third node and the second node, wherein the second connection is different than a first connection that the second node uses to send the another notification to the first node.

14. The system of claim 1, wherein the third node is further configured to:
   receive one or more of the plurality of packets being sent from the first node to the second node;
   store the received one or more of the plurality of packets at the third node; and
   forward the received one or more packets to the second node.

15. A computer-implemented method comprising:
   receiving, using one or more computing devices, one or more packets of a plurality of packets transmitted from a first node at an intermediary node, wherein the plurality of packets are transmitted from the first node to a second node and wherein the one or more packets are received at the intermediary node before the one or more packets are transmitted to the second node;

determining, at the intermediary node, using the one or more computing devices, if a packet loss event has occurred, wherein the packet loss event occurs when a first packet of the plurality of packets is lost during transmission from the first node to the second node;

determining, at the intermediary node, using the one or more computing devices, if the first packet was received from the first node at the intermediary node when it is determined that the packet loss event has occurred;

sending the first packet from the intermediary node to the second node, using the one or more computing devices, when the first packet was received from the first node at the intermediary node; and transmit a notification to the first node indicating that the packet loss event occurred and was remedied when the packet loss event occurs and the first packet is sent to the second node using the one or more computing devices.

16. The method of claim 15, wherein the determining that the packet loss event occurred comprises:

determining that the first packet from the first node has not arrived at the intermediary node, comprising:

determining an order indication for one or more of the plurality of packets received at the intermediary node; and determining that one of the plurality of packets is missing according to the order indication for the one or more of the plurality of packets.

17. The method of claim 15, wherein the determining that the packet loss event occurred comprises receiving, at the intermediary node, another notification being sent from the second node to the first node indicating that the first packet was not received at the second node.

18. The method of claim 15, further comprising:

storing the received one or more data packets at the intermediary node; and forwarding the received one or more packets from the intermediary node to the second node.

19. A non-transitory machine-readable medium comprising instructions stored therein, which when executed by a machine, cause the machine to perform operations comprising:

determining, at an intermediary node, if a packet loss event has occurred, wherein the intermediary node is configured to receive a plurality of packets transmitted from a first node to a second node from the first node before the packets are transmitted to the second node, and wherein the packet loss event occurs when a first packet of the plurality of packets is lost during transmission from the first node to the second node; and taking an action, at the intermediary node, using the one or more computing devices, with respect to the first packet when the packet loss event has occurred, the action comprising determining if the first packet was received from the first node at the intermediary node and stored at the intermediary node when it is determined that the packet loss event has occurred;

sending the first packet to the second node when it is determined that the first packet was received from the first node at the intermediary node; and sending a notification to the first node indicating that the packet loss event occurred and was remedied when the packet loss event occurs and the first packet is sent to the second node by the intermediary node.

20. The machine-readable medium of claim 19, wherein the operations further comprise:

sending another notification to the first node notifying the first node that the first packet has not arrived at the intermediary node when it is determined that the first packet was not received from the first node at the intermediary node, the notification being generated by the intermediary node.

* * * * *